United States Patent
Acker (10) Patent No.: US 9,250,258 B2
(45) Date of Patent: Feb. 2, 2016

(54) SENSOR ARRANGEMENT FOR SPEED MEASUREMENT

(75) Inventor: Heinrich Acker, Schwalbach (DE)

(73) Assignee: Continental Teves AG & Co. oHG (DE)

( * ) Notice: Subject to any disclaimer, the term of this patent is extended or adjusted under 35 U.S.C. 154(b) by 575 days.

(21) Appl. No.: 13/699,854

(22) PCT Filed: Jun. 10, 2011

(86) PCT No.: PCT/EP2011/059746
§ 371 (c)(1),
(2), (4) Date: Nov. 26, 2012

(87) PCT Pub. No.: WO2011/154544
PCT Pub. Date: Dec. 15, 2011

(65) Prior Publication Data
US 2013/0073250 A1    Mar. 21, 2013

(30) Foreign Application Priority Data

Jun. 10, 2010  (DE) .......................... 10 2010 029 961
Jun. 10, 2010  (DE) .......................... 10 2010 029 962

(51) Int. Cl.
| | |
|---|---|
| *G06F 19/00* | (2011.01) |
| *G01P 3/00* | (2006.01) |
| *G01D 5/244* | (2006.01) |
| *G01P 3/489* | (2006.01) |
| *H04Q 9/00* | (2006.01) |

(52) U.S. Cl.
CPC .............. *G01P 3/00* (2013.01); *G01D 5/24404* (2013.01); *G01P 3/489* (2013.01); *H04Q 9/00* (2013.01); *H04Q 2209/84* (2013.01)

(58) Field of Classification Search
CPC .... H01L 2924/00; G08G 1/202; G06Q 10/08; G06Q 10/02
USPC .................................. 702/142, 182–185, 188
See application file for complete search history.

(56) References Cited

U.S. PATENT DOCUMENTS 6,326,778 B1  12/2001  Hummel
(Continued)

FOREIGN PATENT DOCUMENTS

| DE | 196 50 935 | 6/1998 |
|---|---|---|
| DE | 198 11 095 | 9/1999 |

(Continued)

OTHER PUBLICATIONS

International Search Report corresponding to International Patent Application No. PCT/EP2011/059746 dated Sep. 21, 2011.
(Continued)

*Primary Examiner* — Edward Raymond
(74) *Attorney, Agent, or Firm* — RatnerPrestia (57) ABSTRACT

A sensor array including an electronic control unit and a speed sensor that has at least one sensor element. The speed sensor and the electronic control unit are interconnected by at least one line. The speed sensor includes a signal processing circuit which is designed in such a way as to obtain at least one digital frequency signal from the output signal of the sensor element, the at least one digital frequency signal being encoded in a data item, being stored in at least one first memory unit, and being transmitted to the electronic control unit.

19 Claims, 5 Drawing Sheets

(56) References Cited

U.S. PATENT DOCUMENTS

| | | | |
|---|---|---|---|
| 6,646,964 | B1 | 11/2003 | Abramovitch et al. |
| 6,687,644 | B1 | 2/2004 | Zinke et al. |
| 2002/0049506 | A1 | 4/2002 | Birk et al. |
| 2005/0080527 | A1* | 4/2005 | Tao et al. ............ 701/34 |
| 2006/0022868 | A1 | 2/2006 | Awata |
| 2007/0030162 | A1 | 2/2007 | Okada et al. |
| 2007/0085527 | A1 | 4/2007 | Chen et al. |
| 2011/0117903 | A1 | 5/2011 | Bradley |

FOREIGN PATENT DOCUMENTS

| | | |
|---|---|---|
| DE | 100 47 924 | 4/2002 |
| EP | 1 598 672 | 11/2005 |

OTHER PUBLICATIONS

German Search Report corresponding to application DE 10 2011 077 438.6, dated Nov. 29, 2011.

* cited by examiner

SENSOR ARRANGEMENT FOR SPEED MEASUREMENT

CROSS REFERENCE TO RELATED APPLICATIONS

This application is the U.S. National Phase Application of PCT International Application No. PCT/EP2011/059746, filed Jun. 10, 2011, which claims priority to German Patent Application No. 10 2010 029 961.8, filed Jun. 10, 2010 and German Patent Application No. 10 2010 029 962.6, filed Jun. 10, 2010, the contents of such applications being incorporated by reference herein.

FIELD OF THE INVENTION

The invention relates to a sensor arrangement a comprising a speed sensor, which comprises at least one sensor element, and an electronic control unit, wherein the speed sensor and the electronic control unit are connected to one another by at least one line, and the use of said sensor arrangement in motor vehicles.

BACKGROUND OF THE INVENTION

Measuring a rotational speed, which is required in the art on many machines and systems, is physically equivalent to measuring the angular speed. It is generally known to measure the rotational speed of shafts by applying a periodic pattern known as an "encoder" (e.g. a gear) around the circumference of the shaft, which is sensed by a sensor mounted in a fixed position beside the shaft. The sensor is capable of distinguishing between tooth and tooth gap (or other periodically varying properties, such as e.g. magnetic field direction or optical transparency). The sensor then generates an output signal which has the same periodicity as the sensed pattern.

A sensor of this type outputs different signals depending on the signal processing that is present: there are approximately sinusoidal signals, which are usually generated directly from the primary sensor element, or square-wave signals, which are usually generated by comparators by the downstream signal processing. The sinusoidal signals often occur as a sine/cosine signal pair, because this combination has advantages, including with regard to detecting the direction. Any combinations of said signals are possible, so that up to four outputs (and any subset thereof) may exist: sine, cosine, square-wave in phase with sine, square-wave in phase with cosine. All of these signals are analog frequency signals, i.e. the frequency varies continuously within the interval defined by the application. The electrical output signal is a direct image of the encoder. Thus even the square-wave signals cannot be considered to be "digital", because the discrete amplitude variable does not contain discretized information from the sensor. Depending on the implementation, there is also the possibility that the physical sensor-based process generates a signal at twice the frequency of the encoder pattern. This is the case, for instance, for certain AMR sensor elements, which have an electrical signal period that encompasses only a 180° rotation of the (encoder) magnetic field.

If sensors of the type described are used in measuring devices or control systems, then it must be taken into account that the described output signals in no way complete the measurement process: whereas most measurement systems provide output signals that are either digitally encoded or have an output value that is a direct measure of the measurand, for the sensors considered here, the measured value must first be calculated from the output waveform or pulse sequence. This applies to speed, angular-speed and rotational-speed measurements and also to angle measurements, because often absolute measurements are needed, which are obtained from the periodic signal by counting. The sine/cosine signals here have the advantage of the possibility of interpolation, but do involve a higher degree of analysis effort.

The technology presented here is used in the same way for linear position and speed measurement, but using linear rather than annular encoders.

The aforementioned incompleteness of the measurement may result in significant complexity on the receiver side of the sensor signal. Generally, a frequency counter needs to be designed, which uses the conventional methods (gate-time measurement or period-length measurement) to measure the frequency. In a control system having a microcontroller-based design, the aim is often to implement this counter without dedicated hardware by interrupting program execution whenever a level change is detected at the input to which the sensor is connected. Suitable program routines are then executed as part of the interrupt. Unfortunately, the frequent interrupts that occur at high frequencies means that a large amount of processing time for the actual control process is lost. The technique therefore definitely cannot be considered cost-free, because without the frequency counting a controller having a lower performance or lower clock frequency would have sufficed for the same application. The actual counting process is supported in many controller types directly by the integrated hardware ("capture/compare unit"); the work that remains for the program is then to determine the frequency from the counter value and to perform all the other steps.

Strict requirements for keeping any delay short and the large spread between minimum and maximum frequencies in certain applications, e.g. in the automobile, make it necessary to adjust the gate time to the measured frequency (or to swap between gate-time measurement and period-length measurement), in particular in control applications. This makes the program required more complicated and the processing time increases further.

One possible solution is to use dedicated hardware (e.g. a microcontroller or ASIC solely for the frequency measurement), but this increases cost, overall size and power consumption of the overall system.

All considerations of system architecture and costs are based on the assumption that all instrumentation and control systems today work digitally and hence each measurement result must be transferred into the memory of a processor in order to be processed further. In the simplest case, this is a microcontroller that only has an effect on a display.

SUMMARY OF THE INVENTION

An aspect of the invention proposes a sensor arrangement that can be used to implement the frequency measurement and optionally additionally an angle measurement at relatively lower cost, wherein in particular the costs on the sensor side (transmitter) and on the control devices/electronic control unit "ECU"/controller side (receiver) must be considered in total. In the receiver, particularly preferably there shall be no requirement for microcontroller peripherals suitable for supporting a frequency measurement. The load placed on the microcontroller used shall advantageously be minimized by the solution, so that the microcontroller processing power can be designed solely for other tasks, having a corresponding effect on cost and power consumption.

This aspect is achieved according to the invention by the sensor arrangement comprising a speed sensor, which comprises at least one sensor element, and an electronic control unit, wherein the speed sensor and the electronic control unit are connected to one another by at least one line, wherein the speed sensor comprises a signal processing circuit, which is designed so that it obtains from the sensor-element output signal at least one digital frequency signal, which is encoded in a data word and stored in at least a first memory unit and transmitted to the electronic control unit.

The speed sensor preferably comprises a sensor clock generator unit, where the digital frequency signal is scaled by and/or is dependent on said sensor clock generator unit.

It is preferred that at least the sensor clock generator unit is integrated or monolithically formed together with the signal processing circuit on a chip, in particular as an RC oscillator.

The electronic control unit preferably comprises an ECU clock generator unit, which in particular comprises a crystal oscillator or a ceramic oscillator or another oscillator having similar precision.

It is preferred that the sensor arrangement is designed so that the speed sensor successively transmits data words to the electronic control unit at a sensor transmit frequency, wherein this sensor transmit frequency depends on the clock frequency of its sensor clock generator unit, and wherein the electronic control unit is designed so that it detects the sensor transmit frequency and hence, taking into account the clock frequency of the ECU clock generator unit, scales or corrects at least one piece of frequency information of a data word.

It is advantageous that the electronic control unit is designed so that it transmits data request signals to the speed sensor at defined times or at a defined clock rate, and said speed sensor is designed so that it transmits as a response to each of said data request signals a data word to the electronic control unit. The electronic control unit is in this case designed in particular so that it sends the data request signals to the speed sensor in a defined manner on the basis of the clock frequency of its ECU clock generator unit, particularly preferably at a constant request frequency, and that the speed sensor is designed so that it detects the request frequency, and adjusts or corrects the frequency information or the frequency signal of a data word, especially preferably of each data word, according to a ratio of the request frequency to the clock frequency of its own sensor clock generator unit.

The speed sensor is advantageously designed so that a data word comprises at least one or a plurality of the following pieces of information:
 a piece of frequency information or the digital frequency signal,
 a piece of angle information,
 a piece of internal status information from the speed sensor,
 a piece of external status information from at least one external component connected to the speed sensor,
 a piece of identification information from the speed sensor itself and/or
 detailed measurement information.

It is preferred that the speed sensor comprises at least one sensor element and an analog-to-digital converter, which digitizes the sensor-element output signals, wherein the speed sensor comprises a Costas loop unit, which is connected to the output of the analog-to-digital converter, wherein the analog-to-digital converter in particular is in the form of a sigma-delta modulator.

A Costas loop unit is preferably understood to mean an electronic apparatus that comprises a Costas loop for signal processing.

The analog-to-digital converter is preferably in the form of a sigma-delta modulator.

The Costas loop unit is preferably designed so that it provides at least a frequency output signal or a phase output signal or a frequency output signal and a phase output signal, each on the basis of the sensor-element output signal.

It is preferred that the output of the analog-to-digital converter, which provides a bit stream, is connected in each case to a first multiplier and to a second multiplier, wherein additionally the first multiplier and the second multiplier are each fed with a clock signal from the sensor clock generator unit, wherein the clock signals fed to the first multiplier and the second multiplier are offset in phase by 90° with respect to one another, wherein the output signal from the first multiplier and the second multiplier is fed in each case to a low-pass filter, the outputs of which are each fed to a common phase detector unit, which is connected on the output side to a controller unit, the output of which is connected to the sensor clock generator unit. In particular, the Costas loop unit comprises or forms the above preferred circuit.

The sensor clock generator unit is preferably in the form of a numerically controlled oscillator also known as an "NCO", "digitally controlled oscillator" or "DCO", wherein said sensor clock generator unit provides the frequency output signal and/or the phase output signal as output signals from the Costas loop unit.

It is preferred that the output signal from the phase detector unit and the phase output signal from the sensor clock generator unit are summated, in particular in a summator, thereby generating a corrected phase signal that forms an output signal from the Costas loop unit, in particular alternatively or additionally to the phase output signal from the sensor clock generator unit. This summation or summator is understood to mean in particular likewise a subtraction or a respective subtraction circuit. This summation and hence the formation of the corrected phase signal take place particularly preferably in a correction device of the speed sensor.

The speed sensor preferably comprises an output circuit to which are fed from the Costas loop unit a frequency signal and at least one phase signal, in particular the frequency output signal from the sensor clock generator unit and the phase output signal from the sensor clock generator unit and/or the corrected phase signal, wherein the output circuit comprises at least one driver stage for transmitting the output signal from the speed sensor over at least one line, and comprises a logic unit, which is used to provide the output signal from the output circuit such that it has defined signal properties as a defined interface.

It is preferred that the logic unit is designed to be programmable and/or switchable, so that the output signal from the output circuit and hence from the speed sensor is designed to be adaptable to different interface requirements. In this case, the logic unit comprises in particular a simple connecting line between a flip-flop of a phase register and the output, wherein the driver stage switches whenever the state of this flip-flop changes, i.e. the phase exceeds a certain threshold value. In the preferably alternative switchable design or additional switchable design of the logic unit, the logic unit generates a data word in which at least one piece of frequency information and/or phase information is encoded.

At least the Costas loop unit and the output circuit are preferably in the form of digital circuits.

It is advantageous that the logic unit comprises a compensation device, which contains, in particular in at least one table, compensation data, which can be used to compensate for encoder errors, the modulated magnetic field or optical pattern of which the sensor element detects, and/or can be used to compensate for temperature effects and/or can be used to adjust or program a phase shift and/or can be used to compensate for a delay in the signal path within the sensor, for which purpose the compensation device is controlled from outside the speed sensor and/or is controlled internally, autonomously by the speed sensor.

In particular, the sensor arrangement according to the invention is based on the idea of determining the frequency to be measured or the angle already in the sensor, i.e. abandoning the incomplete measurement, which is not completed until the frequency measurement is made in the receiver. The sensor preferably contains a signal processing circuit, which either performs the frequency counting and/or angle measurement from one or a plurality of the otherwise typical output signals, or can determine a frequency and phase directly from the sensor signal, e.g. by a phase controller. This means that the sensor already contains the processor, in the memory of which the measurement result is held. This information is therefore transferred to the receiver in the form of a data word on a digital, preferably serial, interface; the analog frequency signal as a transmission form is dispensed with entirely. The sought saving of resources is preferably achieved by it only being necessary in the receiver to create a copy of the transmitted data, while no decoding resources are needed and no counting or reading of counter values at specific times takes place. One advantage of this is that a shift in signal edges caused by component tolerances or propagation delays no longer affects the measurement result, provided the tolerances remain within the permitted range of the selected interface.

Digital controllers normally work at or with a fixed clock rate, at which they cyclically run through the stages of retrieving sensor information, calculating the response and adjusting the actuators. Thus for control applications, the frequency at which the data words are meant to arrive at the receiver has an upper limit given by the frequency of this cycle, because the controller, i.e. the microcontroller of the electronic control unit, cannot respond anyway to sensor signals in a shorter time than one cycle period. This fact must be taken into account in particular when comparing the solution according to the prior art with the new solution: if the frequency of the analog frequency signals from an implementation according to the prior art is greater than the frequency at which data words can be transmitted according to the new solution, it cannot be concluded from this that the implementation according to the prior art works faster. Apart from the described limit imposed by the controller cycle, it must be taken into account that it is still necessary to calculate from the analog frequency pulse sequence the data word that already exists in the sensor arrangement according to the invention. A number of pulses are required for this purpose, where this number depends on the application and may be very high depending on the accuracy required.

The completely different partitioning of the system or sensor arrangement according to the invention compared with conventional rotational-speed or angular-speed sensors enables new, preferred functions, which are either not possible in the conventional system design or can only be realized with great difficulty:

1. The output signal is freely scalable. A function block which performs a programmable mathematical mapping can be connected between the frequency-measuring signal processing and the output of a data word. This allows any adaptations to be made between the encoder (having a defined number of periods around the circumference) and the receiver. By means of this programmability, the sensor acts as an adapter between components that have not been designed to match each other.

2. Until now, specifying a number of pulses per revolution in association with an encoder radius likewise meant fixing a period length to the encoder circumference. Hence in practice very large differences arise in the period length, depending on the application. A universally usable sensor, which is meant to benefit from the economies of scale of producing in large quantities, must support all these period lengths. Specifying a fixed period length, however, has instrumentational advantages for the sensor element. These can be exploited for the first time using the sensor arrangement according to the invention, because every preferred period length can be selected (by suitable programming of the sensor) for an encoder radius specified by the user and for the required scaling of the data word.

3. The messages that are transmitted via the digital interface can contain additional information. There is a high demand for transmitting such additional information, which can be seen from the example of wheel speed sensors in the automobile. In this case, the usual analog frequency interface is extended to include an additional protocol, in which a plurality of bits are transmitted after each set of speed pulses. At and above an application-dependent cut-off speed, however, there is not the necessary time between the speed pulses in order to transmit the protocol word in full. Then different cases are needed for different grades of incompleteness; furthermore, the protocol cannot be used for information that is needed always or particularly at high speeds.

In particular the sensor arrangement according to the invention removes many restrictions regarding the transmitted data. For instance, the data word can be divided into one or more of the following areas, or into each subset thereof:
a) angular speed (or speed, frequency, rotational speed)
b) angle (or phase, position)
c) internal status information (sensor status e.g. error-flag status)
d) external status information (from connected components, e.g. a component for detecting brake-pad wear that is a common addition to wheel speed sensors)
e) information for traceability (e.g. serial number)
f) further processing of measurement data, in particular of a. and b., in order to supply higher-order information that further relieves the load on the receiver unit (see also point 4 below).

In particular, the freedom in the allocation of data to areas of data words means that by using the sensor arrangement according to the invention it is likewise possible to mix different forms of data words or messages, which in turn can be distinguished by the receiver by a type field in each data word. Two of many possibilities are mentioned below by way of example:

certain messages contain only the angular speed, other messages the angle. Both types can be sent at a different frequency;

only the first message after switching on the system contains information about traceability; this information is omitted in all other messages in order to save transmission bandwidth.

4. The unrestricted structure of the messages according to point 3 advantageously enables calculations to be carried out in the speed sensor and the results to be transmitted. At first glance, purely displacing a calculation from one unit into another appears less attractive, but there are two reasons that can make a calculation in the sensor very advantageous:

a) If the sensor is implemented e.g. in the form of an ASIC, but a connected controller is a generic processing unit, the sensor can comprise application-specific, hardwired computing units, which perform the function in question far more efficiently in terms of time and energy than the software in the controller.

b) If the frequency at which messages are meant to be transmitted (or can be transmitted, because of application-dependent bandwidth limits) is less than half the maximum relevant frequency in the primary signal of the sensor element, information is lost (sampling theorem), assuming only instantaneous values of a signal are transmitted. The sensor can then perform parameter extraction on the primary signal and transmit parameters instead of or in addition to instantaneous values. Parameter extraction of this type normally saves bandwidth, because signal parameters change more slowly than instantaneous values.

Determining parameters from the internal combustion engine using short-term variations in the rotational speed of the crankshaft is presented below in greater detail as an exemplary embodiment. Using this case by way of example for the sensor arrangement according to the invention, the rotational speed variations used for parameter extraction occur so rapidly that it would not be practical to transmit messages at a frequency that allows analysis of the rotational speed variations at the receiver end. Instead, use is made of the fact that the rotational speed variations repeat themselves practically periodically and amplitude of said variations only changes slowly. From the process for which one process variable (rotational speed) is measured by the sensor, further process variables (parameters) which only result indirectly from the change over time of the measured variable are preferably determined using the solution according to the invention.

Measuring a frequency is crucially dependent on a time base. Crystal oscillators are preferably used for this purpose. They have the highest accuracy but cannot be monolithically integrated, are sensitive to the maximum operating temperature and vibration, and are expensive. Therefore RC oscillators are preferred if possible. The frequency tolerance of RC oscillators may be acceptable for a clock generator in a digital circuit, but not for a frequency measurement. Since the sensor arrangement according to the invention is composed of two digital circuits—speed sensor and electronic control unit or controller—the question arises of which oscillator type to use where. If an oscillator of each type is used, then that component performing the frequency measurement should have the crystal oscillator, i.e. the sensor should have it. This allocation is distinctly disadvantageous in many applications, however, because the sensor is often exposed to harsher environmental conditions and installation space there is particularly tight. It is therefore preferable to locate the time base, i.e. the more precise oscillator, in the controller or the electronic control unit, and not in the sensor. There are two alternative exemplary embodiments of this application:

1. The sensor measures a frequency relative to its local oscillator frequency, which has a large tolerance associated with it. The clock rate at which data words are transmitted via the digital interface is also coupled to the oscillator frequency. After measuring this clock rate, the receiver can thereby determine the current frequency of the sensor oscillator and scale the result accordingly. Although this is again associated with a frequency measurement, it involves a far lower typical maximum frequency than the pulse frequency according to the prior art. Furthermore, it is known from the type of the sensor oscillator, in which intervals this measurement must be repeated in order to meet the tolerance requirements. Drift and temperature variation generally proceed so slowly that measurements at intervals of seconds are adequate, which constitute a negligible load on the receiver.

2. The sensor is triggered by the controller to transmit data words. This method assumes elementary, bidirectional communication. The sensor is thus advantageously incorporated in the cycle of the controller. The effect of the triggering is that the most recent measurement is transmitted exactly at the time at which a measurement result is required for the control process. The dead time of the control system is particularly short because of this coordination. The frequency measurement is now scaled by the sensor, which measures the intervals between trigger pulses and thereby determines the current tolerance of its local oscillator. As regards the frequency of these measurements and the load resulting therefrom, the same applies as was stated in point 1.

In addition, the invention also relates to the use of the speed sensor in motor vehicles, in particular as a crankshaft speed sensor or wheel speed sensor or as a rotational speed sensor in powertrain components, for example in this case as a gear speed sensor, or turbocharger speed sensor, or alternatively preferably in linear, incremental sensors.

BRIEF DESCRIPTION OF THE DRAWINGS

The invention is best understood from the following detailed description when read in connection with the accompanying drawings. Included in the drawings is the following figures.

LIST OF REFERENCES

1 ECU clock generator unit or oscillator in the controller
2 divider
3 microcontroller in the ECU
4 serial-to-parallel converter
5 electronic control unit ECU or controller
6 transmit device
7 signal processing circuit or signal processor
8 sensor element: the physical transducer element. Converts the variable that is modulated by the encoder into an electrical variable
9 sensor clock generator unit, in the form of a numerically controlled oscillator "NCO" by way of example, shown having two outputs "sin" and "cos" having a mutual phase offset of 90°.
10 speed sensor or sensor
12 analog-to-digital converter, in the form of a sigma-delta modulator by way of example
14 controller unit or controller: defines by its transfer function the "translation" of phase difference into the change in the NCO frequency
15 phase detector unit or phase detector
16 frequency register
17 phase register 18 logic unit or logic block in the output circuit for pulse generation as the output signal from the speed sensor
T1 signal from the controller to the sensor (trigger)
T2 signal from the sensor to the controller (data words)
S signal amplitude in any units
t time

DETAILED DESCRIPTION OF THE PREFERRED EMBODIMENTS

Figure 1:
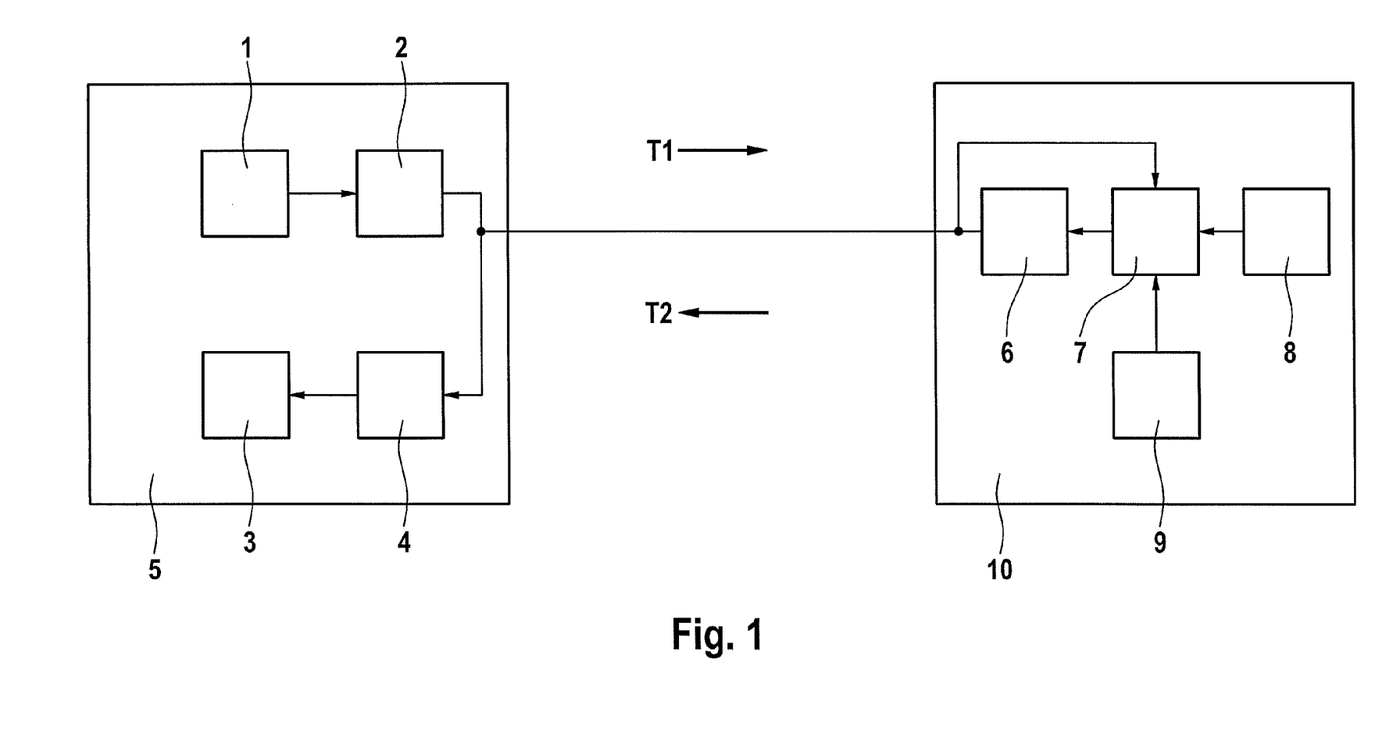
FIG. 1 illustrates a sensor arrangement according to an aspect of the invention.
Figure 2:
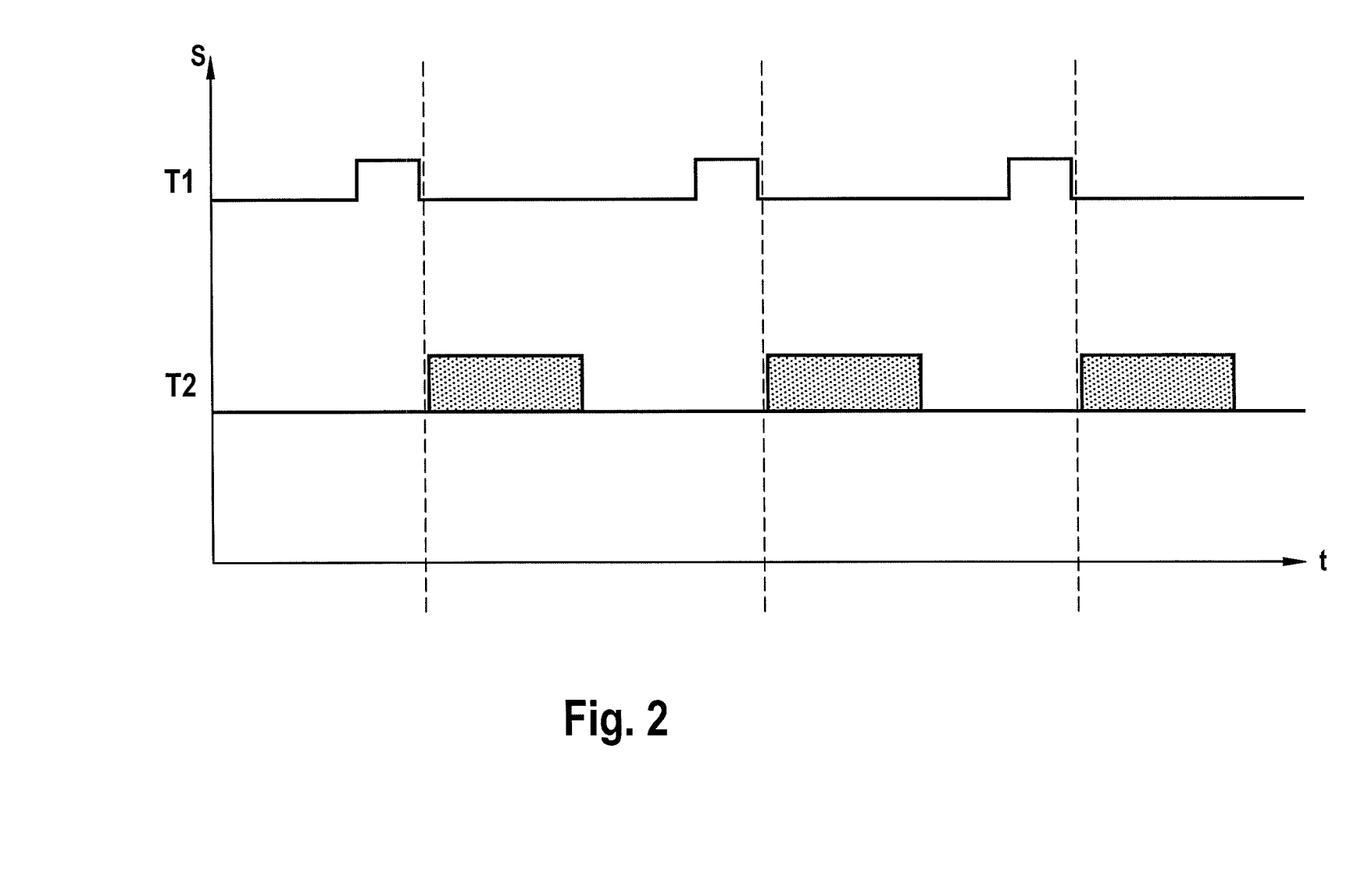
FIG. 2 illustrates an exemplary variation over time of signals that are transmitted between the two units involved.

The exemplary embodiment of the sensor arrangement is illustrated schematically by FIGS. 1 and 2. FIG. 1 shows the sensor arrangement itself; FIG. 2 shows the exemplary variation over time of signals that are transmitted between the two units involved: the electronic control unit 5 or controller 5 (or control device or ECU 5) and the speed sensor 10.

Figure 3:
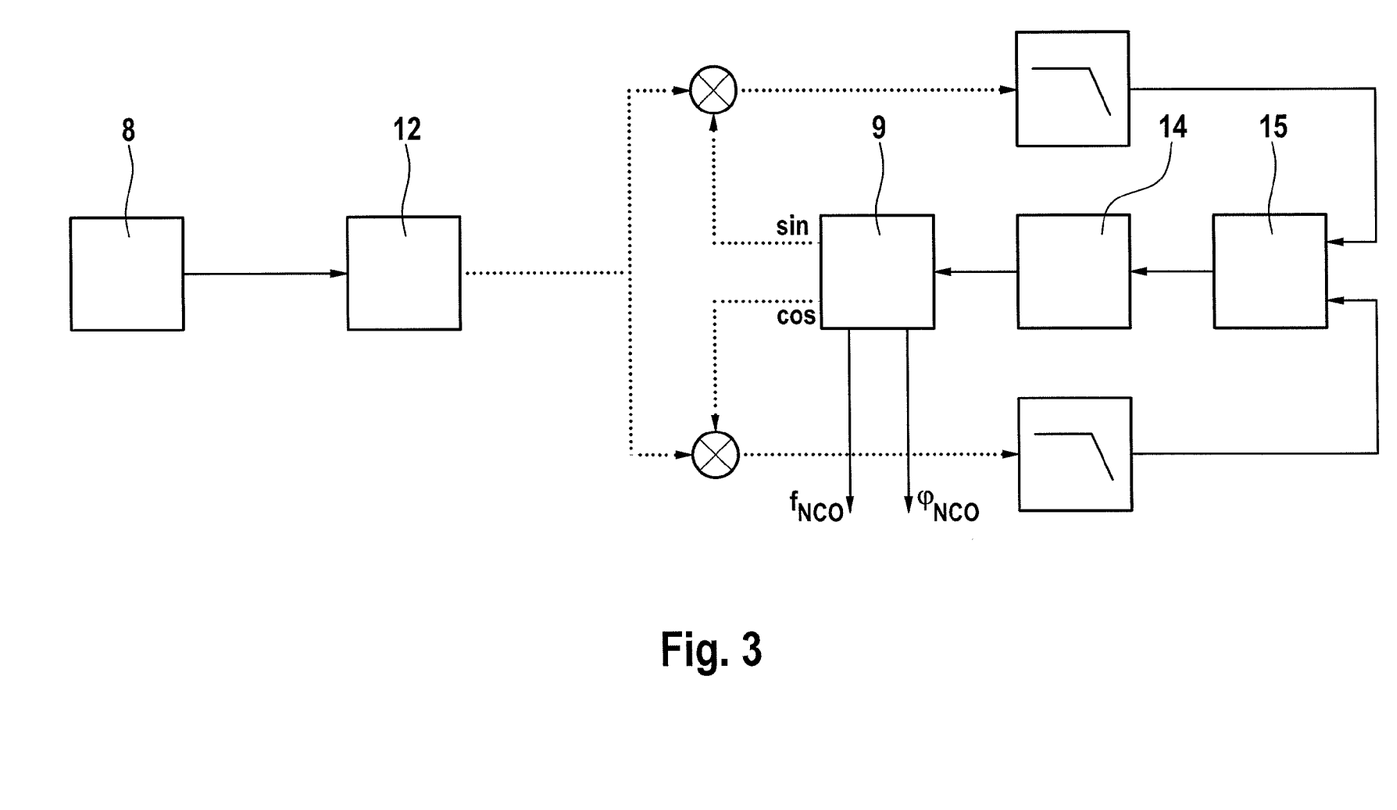
FIG. 3 illustrates a circuit for frequency measurement and phase measurement by means of the Costas loop device or Costas loop and sensor element.
Figure 4:
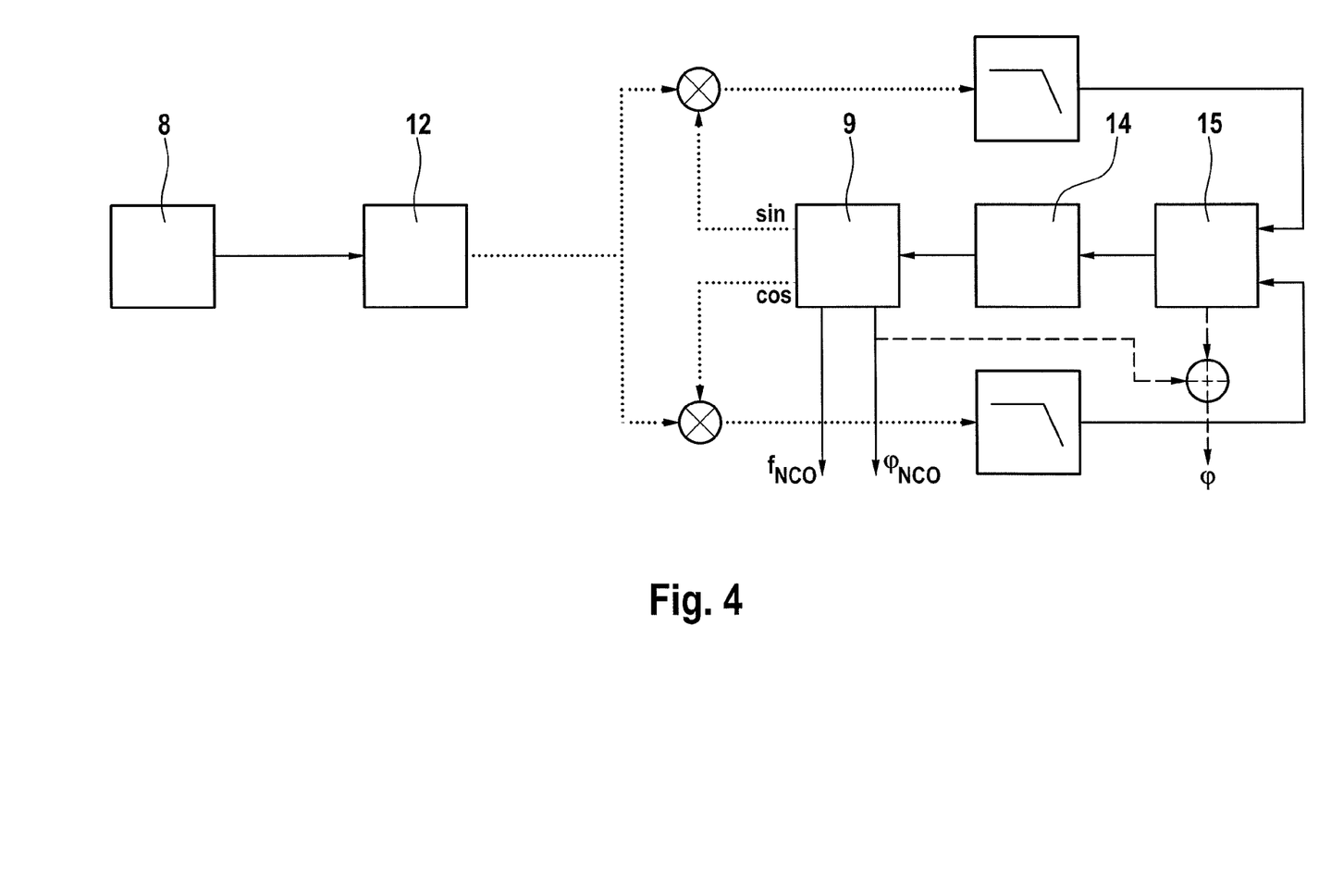
FIG. 4 illustrates a solution comprising a correction device for improving the phase measurement or for generating a corrected phase signal.
Figure 5:
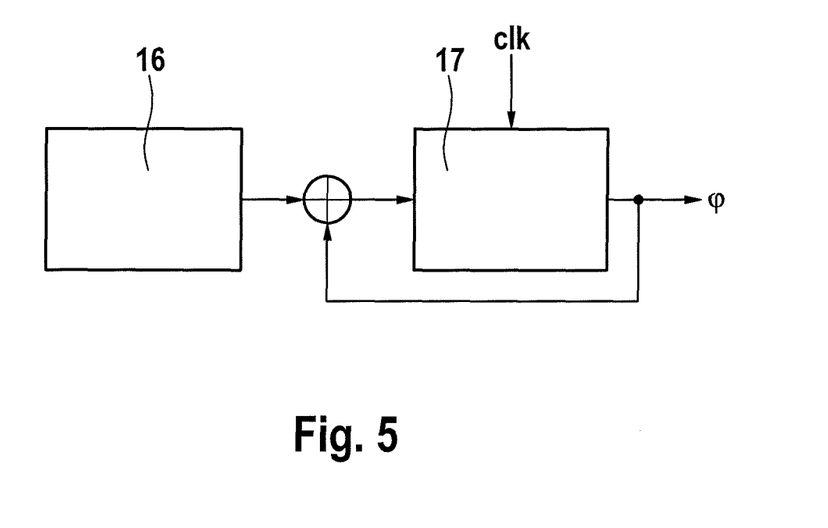
FIG. 5 illustrates a design of an exemplary sensor clock generator unit as an NCO.
Figure 6:
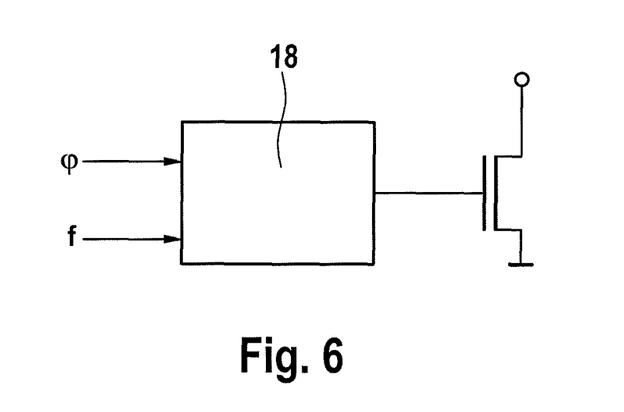
FIG. 6 illustrates an output circuit for generating the usual output pulses.

An exemplary embodiment of the speed sensor is also illustrated schematically by FIGS. 3 to 6. FIG. 3 shows the circuit for frequency measurement and phase measurement by means of the Costas loop device or Costas loop and sensor element; FIG. 4 shows the solution comprising a correction device for improving the phase measurement or for generating a corrected phase signal. FIG. 5 shows the design of an exemplary sensor clock generator unit as an NCO. FIG. 6 shows the output circuit for generating the usual output pulses.

In FIG. 1, the signal flow starts at the ECU clock generator unit 1, which is integrated in electronic control unit 5 or controller 5. The clock generator unit is a crystal oscillator by way of example. The frequency of this oscillator is not only used internally in ECU 5 as the clock generator, but is passed to a divider 2 in order to provide a clock for communication with the speed sensor 10. Divider 2 is required in order to divide down the oscillator frequency, which normally lies in the MHz region, because the frequency of the data transmission typically lies in the low KHz region or even below that. At the output of the divider 2 lies the trigger signal T1, which is placed on the data-transfer line to which the sensor 10 is connected. The sensor 10 has a signal processing circuit 7, to which additionally the signals from the sensor element 8 and the oscillator 9 of the sensor are applied. The signal processing circuit 7 is clocked by the signal from the sensor clock generator unit 9, whereby the measurement result of the frequency of the sensor element 8 depends on tolerances of the oscillator frequency. The signal T1 is used in this context as a frequency standard. Although the frequency of T1 is too low to be used to clock the signal processor 7, it is however possible to compensate for the tolerances of the oscillator 9 by measuring also the frequency of T1 in addition to measuring the frequency of the sensor element 8. Various options are known for performing the correction. For instance, a counter can be used in order to measure the period length of T1 using the signal from the oscillator 9 or sensor clock generator unit 9. The counter value, which represents the period length, is divided by a constant nominal value, which is fixed when designing the system. A correction factor for the frequency of the sensor element 8, which is likewise measured by the oscillator 9, is then obtained from the ratio. Hence, for example, signal T1 is used for triggering the sensor and additionally for performing the correction using T1 as the frequency standard.

After the correction is carried out, the corrected signal, the tolerance of which is now defined by the frequency tolerance of the oscillator 1 or ECU clock generator unit 1, is available at the output of the signal processing circuit 7. By means of a transmit device 6, in the simplest case a switching transistor, the data word computed by the signal processor 7 is sent as signal T2 along the path to the controller 5 or ECU 5. Here a serial-to-parallel conversion 4 is performed so that the data word can be stored in the memory of the microcontroller 3. The conversion usually takes place in the microcontroller 3, which, depending on the type, may have internal logic circuitry for such functions.

FIG. 2 shows the variation over time of the signals T1 and T2. In this example, the trigger signal T1 acts on the falling edge. Immediately afterwards, transmission of the data word, the signal T2, is started. The data words are symbolized by the gray fields. The system is easy to expand by additional transmitters using the gap between the end of the data word and the next trigger signal. Alternatively, sensors can be programmed so that they only transmit on every $n^{th}$ trigger pulse, and then the unused trigger signals trigger other sources to transmit. Both forms of method are mentioned in order to illustrate that the sensor arrangement according to the example is compatible with all the methods that are used in electronic interfaces. This also applies to the nature of the signals T1 and T2, which in principle can take any form. Known forms are e.g. voltage signals and current signals, single and differential signals and transmission by electrical and magnetic fields or electromagnetic waves.

The signal T1 is not necessarily limited to the trigger function. The density of the pulses can additionally be used for transmission of information if in this case the exact interval required for the trigger function is kept open. If e.g. the frequency of T1 has the value 1 kHz, and the sensor clock generator unit 9 has a frequency tolerance of 20%, then the sensor waits after each trigger pulse for the next trigger pulse after a delay of 0.8 ms until a maximum of 1.2 ms. Outside this time window, pulses can be blanked out by the trigger system, in order to be decoded by another unit in the sensor. Even the absence of trigger pulses can be used in this way for transmitting information. In addition, a high-performance, bidirectional transmission can be implemented by using separate pulses to represent the sub-functions "trigger data transmission from the sensor" and "supply a frequency standard". The individual pulses of T1 then likewise become data words, the start of which supplies the frequency standard and the end of which performs triggering.

In FIG. 3, the signal flow starts at the sensor element 8. The output signal, usually a voltage, is routed to the sigma-delta modulator 12. The modulator generates a bit sequence ("bit stream") therefrom that contains a density of ones that is proportional to the sensor signal. The bit streams are represented by the dotted lines for clarity. The output signal from the modulator is applied to the inputs of two multipliers (represented by the standard circuit symbol), and the other input of each multiplier, as the sensor clock generator unit, is connected to an output of the NCO 9. The NCO outputs are labeled with "sin" and "cos" to illustrate the 90° phase offset between the outputs. Since bit streams are involved, the multipliers are merely single XOR gates. They generate two further bit streams, which contain as frequencies the sum and difference of the input frequencies, i.e. the frequency of the sensor element and the frequency of the NCO 9. The two downstream low-pass filters, represented by the standard symbols, filter out just the difference from the frequency mix. Low-frequency signals are thereby produced from the (high-frequency) bit streams but which have a word length of significantly greater than 1 bit, e.g. 10 bits. The phase offset of the NCO outputs means that the output signals from the low-pass filters also have a mutual phase offset of 90°. Thus an angle can be determined from these signals. This is the task of the phase detector unit 15. The output signal from this unit corresponds to the phase difference between input and NCO.

For this purpose, the phase detector unit uses by way of example for the calculation the four-quadrant arc tangent on its inputs. Using the four-quadrant arc tangent has the advantage of doubling the region of uniqueness from the usual interval $[-\pi/2, \pi/2]$ to $[-\pi, \pi]$. The phase difference is converted in the controller unit 14 using a suitable transfer function and, if applicable, a suitable control strategy, into a signal that controls the frequency of the NCO 9. This closes the control loop.

The outputs of the circuit are the frequency $f_{NCO}$ and the phase $\phi_{NCO}$ of the NCO. These values are available directly in the NCO registers.

FIG. 4 shows the exemplary addition to the Costas loop unit or Costas loop. The addition, shown dashed, is the part that differs from FIG. 3. The phase is taken from the output $\phi_{NCO}$ of the NCO 9 and fed to a summator or summation unit, at the other input of which lies the phase difference from the phase detector unit 15. The sum or the difference, depending on which sign is used in the control system of the particular implementation, is then the corrected phase or corrected phase signal. Short-term control errors have less effect on the phase measurement in this form, because the delay through the control process is removed. This reduces the requirements placed on the control quality of the entire system.

FIG. 5 shows the elements of the NCO 9 as the sensor clock generator unit. The phase register 17 contains the current phase of the NCO. In each step, triggered by the clock signal clk, which has a constant frequency, the contents of the phase register are updated by being summated with the value from the frequency register 16. Hence the rate at which the phase changes becomes proportional to the contents of the frequency register. Controller unit 14 affects this frequency register by setting a new frequency value according to the phase difference. The outputs "sin" and "cos" are derived from the phase $\phi$ by simply switching over the value of the output for specific values of the phase that equal the even and odd multiples of 90°. A single flip-flop and a gate are sufficient to derive each of the outputs, provided the phase is scaled so that there is a binary digit in the phase register that is equivalent to 90°.

Unlike analog implementations of phase locked loops, which are based on VCOs, an NCO can only ever work with discrete frequency values and phase values fixed by the design. This does not mean that there is any restriction on its use in practice, because the resolution can be increased to practically any level. For each additional bit, it is merely necessary to widen the registers and summators accordingly, which only requires a few additional gates.

FIG. 6 illustrates the output circuit. This is essentially a logic unit 18 or a logic block having frequency and phase as inputs and an output which operates a switching transistor as the driver stage for generating the output pulses. An open-drain output is shown by way of example, although in addition to an open collector, a push-pull stage in MOS or bipolar technology is also possible, and likewise any other circuit that can generate two output levels by electronic means.

The contents of the logic unit or logic block depend on the functions that are meant to be possible using the sensor. In the simplest case, the block can be composed of a simple connecting line between a flip-flop of the phase register and the output. Then the transistor switches whenever the state of this flip-flop changes, i.e. whenever the phase exceeds a certain threshold value. Functions such as the above mentioned programmability, compensation for delay time and compensation of encoder errors require logic circuitry, however, in which the threshold value can be shifted on the basis of additional information.

The invention claimed is:

1. A sensor arrangement comprising:
   an electronic control unit including a clock generator for generating a trigger signal; and
   a speed sensor connected to the electronic control unit by at least one line,
   wherein the speed sensor includes a first memory unit, at least one sensor element and a signal processing circuit, the signal processing circuit is configured to obtain from the at least one sensor-element at least one digital frequency signal, which is encoded in a data word and stored in the first memory unit and transmitted to the electronic control unit over the at least one line in response to receiving the trigger signal from the electronic control unit over the at least one line.

2. The sensor arrangement as claimed in claim 1, wherein the speed sensor comprises a sensor clock generator unit, where the digital frequency signal is scaled by and/or is dependent on said sensor clock generator unit.

3. The sensor arrangement as claimed in claim 2, wherein at least the sensor clock generator unit is integrated together with the signal processing circuit on a chip.

4. The sensor arrangement as claimed in claim 2, wherein at least the sensor clock generator unit is integrated together with the signal processing circuit on a chip as an RC oscillator.

5. The sensor arrangement as claimed in claim 2, wherein the electronic control unit comprises an ECU clock generator unit.

6. The sensor arrangement as claimed in claim 2, wherein the electronic control unit comprises an ECU clock generator unit comprising a crystal oscillator.

7. The sensor arrangement as claimed in claim 5, wherein the speed sensor successively transmits data words to the electronic control unit at a sensor transmit frequency, wherein the sensor transmit frequency depends on the clock frequency of the sensor clock generator unit, and wherein the electronic control unit detects the sensor transmit frequency and hence, taking into account the clock frequency of the ECU clock generator unit, scales or corrects at least one piece of frequency information of a data word.

8. The sensor arrangement as claimed in claim 5, wherein the electronic control unit transmits data request signals to the speed sensor at defined times or at a defined clock rate, and said speed sensor transmits as a response to each of said data request signals a data word to the electronic control unit.

9. The sensor arrangement as claimed in claim 8, wherein the electronic control unit sends the data request signals to the speed sensor in a defined manner on the basis of the clock frequency of its ECU clock generator unit, at a constant request frequency, and wherein the speed sensor detects the request frequency, and adjusts or corrects the frequency information or the frequency signal of a data word.

10. The sensor arrangement as claimed in claim 8, wherein the electronic control unit sends the data request signals to the speed sensor in a defined manner on the basis of the clock frequency of its ECU clock generator unit, at a constant request frequency, and wherein the speed detects the request frequency, and adjusts or corrects the frequency information or the frequency signal of a data word according to a ratio of the request frequency to the clock frequency of its own sensor clock generator unit.

11. The sensor arrangement as claimed in claim 8, wherein the electronic control unit sends the data request signals to the speed sensor in a defined manner on the basis of the clock frequency of its ECU clock generator unit, at a constant request frequency, and wherein the speed sensor detects the request frequency, and adjusts or corrects the frequency information or the frequency signal of each data word according to a ratio of the request frequency to the clock frequency of its own sensor clock generator unit.

12. The sensor arrangement as claimed in claim 1, wherein a data word comprises at least one or a plurality of the following pieces of information:
    a piece of frequency information or the digital frequency signal,
    a piece of angle information,
    a piece of internal status information from the speed sensor,
    a piece of external status information from at least one external component connected to the speed sensor,
    a piece of identification information from the speed sensor itself and/or
    detailed measurement information.

13. The sensor arrangement as claimed claim 1, wherein the speed sensor comprises at least one sensor element and an analog-to-digital converter, which digitizes the sensor-element output signals, wherein the speed sensor comprises a Costas loop unit, which is connected to the output of the analog-to-digital converter, and wherein the analog-to-digital converter is in the form of a sigma-delta modulator.

14. The sensor arrangement as claimed in claim 13, wherein the Costas loop unit provides at least a frequency output signal ($f_{NCO}$) or a phase output signal ($\phi_{NCO}$) or a frequency output signal ($f_{NCO}$) and a phase output signal ($\phi_{NCO}$), each on the basis of the sensor-element output signal.

15. The sensor arrangement as claimed in claim 13, wherein the output of the analog-to-digital converter, which provides a bit stream, is connected in each case to a first multiplier and to a second multiplier, wherein additionally the first multiplier and the second multiplier are each fed with a clock signal from a sensor clock generator unit, wherein the clock signals (sin, cos) fed to the first multiplier and the second multiplier are offset in phase by 90° with respect to one another, wherein the output signal from the first multiplier and the second multiplier is fed in each case to a low-pass filter, the outputs of which are each fed to a common phase detector unit, which is connected on the output side to a controller unit, the output of which is connected to the sensor clock generator unit.

16. The sensor arrangement as claimed in claim 15, wherein the sensor clock generator unit is in the form of a numerically controlled oscillator, wherein said clock generator unit provides the frequency output signal ($f_{NCO}$) and/or the phase output signal ($\phi_{NCO}$) as output signals from the Costas loop unit.

17. The sensor arrangement as claimed in claim 15, wherein the output signal from the phase detector unit and the phase output signal ($\phi_{NCO}$) from the sensor clock generator unit are summated, in a summator, thereby generating a corrected phase signal ($\phi$) that forms an output signal from the Costas loop unit, alternatively or additionally to the phase output signal ($\phi_{NCO}$) from the sensor clock generator unit.

18. The sensor arrangement as claimed in claim 13, wherein the speed sensor comprises an output circuit to which are fed from the Costas loop unit the frequency output signal ($f_{NCO}$) from the sensor clock generator unit and the phase output signal ($\phi_{NCO}$) from the sensor clock generator unit and/or the corrected phase signal ($\phi$), wherein the output circuit comprises at least one driver stage for transmitting the output signal from the speed sensor over at least one line, and comprises a logic unit, which is used to provide the output signal from the output circuit such that it has defined signal properties as a defined interface, wherein the logic unit is programmable and/or switchable, so that the output signal from the output circuit and hence from the speed sensor is adaptable to different interface requirements.

19. The sensor arrangement as claimed in claim 18, wherein the logic unit comprises a compensation device, which contains at least one table comprising compensation data, which can be used to compensate for encoder errors, the modulated magnetic field or optical pattern of which the sensor element detects, and/or can be used to compensate for temperature effects and/or can be used to adjust or program a phase offset and/or can be used to compensate for a delay in the signal path within the sensor, for which purpose the compensation device is controlled from outside the speed sensor and/or is controlled internally, autonomously by the speed sensor.

* * * * *